(12) United States Patent
Li et al.

(10) Patent No.: US 12,395,879 B2
(45) Date of Patent: Aug. 19, 2025

(54) METHOD FOR MEASUREMENT-RELAXATION REQUIREMENT DETERMINATION AND TERMINAL DEVICE

(71) Applicant: GUANGDONG OPPO MOBILE TELECOMMUNICATIONS CORP., LTD., Guangdong (CN)

(72) Inventors: Haitao Li, Guangdong (CN); Yi Hu, Guangdong (CN); Cong Shi, Guangdong (CN); Rongyi Hu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 360 days.

(21) Appl. No.: 18/052,871

(22) Filed: Nov. 4, 2022

(65) Prior Publication Data
US 2023/0089930 A1    Mar. 23, 2023

Related U.S. Application Data

(63) Continuation of application No. PCT/CN2020/090090, filed on May 13, 2020.

(51) Int. Cl.
*H04W 24/10* (2009.01)
*H04W 24/08* (2009.01)
(Continued)

(52) U.S. Cl.
CPC .................... *H04W 24/10* (2013.01)

(58) Field of Classification Search
CPC ............. H04W 24/10; H04W 52/0216; H04W 52/0229; H04W 52/028; H04W 36/0088;
(Continued)

(56) References Cited

U.S. PATENT DOCUMENTS

2019/0320490 A1    10/2019  Liu et al.
2020/0314868 A1*   10/2020  Tseng .................. H04W 8/08
(Continued)

FOREIGN PATENT DOCUMENTS

CN    108882293    11/2018
CN    110839254    2/2020
(Continued)

OTHER PUBLICATIONS

CATT, "Discussion on the remaining issues for RRM measurement relaxation," 3GPP TSG-RAN4 Meeting #94bis-e, R4-2003250, Apr. 2020.
(Continued)

*Primary Examiner* — Kevin T Bates
*Assistant Examiner* — Yonghong Zhao
(74) *Attorney, Agent, or Firm* — Hodgson Russ LLP

(57) ABSTRACT

A method for measurement-relaxation requirement determination is provided. The method includes the following. If a measurement result of a serving cell fulfills both a first measurement-relaxation criterion and a second measurement-relaxation criterion, a terminal device determines, based on first information, a measurement requirement for performing measurement relaxation on a neighbor cell. The first information includes at least one of: first indication information transmitted by a network device, a measurement requirement specified in a protocol, a first measurement requirement corresponding to the first measurement-relaxation criterion and a second measurement requirement corresponding to the second measurement-relaxation criterion, or a period in which the measurement result of a serving cell fulfills the first measurement-relaxation criterion and a period in which the measurement result of a serving cell fulfills the second measurement-relaxation criterion. Another method for measurement-relaxation requirement
(Continued)

determination, an electronic device, and a storage medium are further provided.

16 Claims, 5 Drawing Sheets

(51) Int. Cl.
*H04W 36/00* (2009.01)
*H04W 48/16* (2009.01)
*H04W 52/02* (2009.01)

(58) Field of Classification Search
CPC .. H04W 36/0094; H04W 48/16; H04W 24/08
See application file for complete search history.

(56) References Cited

U.S. PATENT DOCUMENTS

| | | | | |
|---|---|---|---|---|
| 2021/0105643 | A1* | 4/2021 | Kim | H04W 48/16 |
| 2021/0105649 | A1* | 4/2021 | Lee | H04W 24/10 |
| 2021/0235344 | A1* | 7/2021 | Jung | H04W 36/32 |
| 2021/0352507 | A1* | 11/2021 | He | H04W 52/0216 |

FOREIGN PATENT DOCUMENTS

| | | |
|---|---|---|
| CN | 110891313 | 3/2020 |
| CN | 111107594 | 5/2020 |
| EP | 4094485 | 11/2022 |
| WO | 2019199391 | 10/2019 |

OTHER PUBLICATIONS

VIVO, "RRM measurement relaxation criteria," 3GPP TSG-RAN WG2 Meeting #107bis, R2-1912334, Oct. 2019.
CNIPA, First Office Action for CN Application No. 202310087571. 2, May 22, 2024.
Mediatek Inc., "Configurations for RRM Measurement Relaxation," 3GPP TSG-RAN WG2 Meeting #109bis, R2-2002735, Apr. 2020.
Mediatek Inc., "Discussion on RRM measurement relaxation in Idle/Inactive mode," 3GPP TSG-RAN WG4 Meeting #94-e-Bis, R4-2003600, Apr. 2020.
Catt, "Presentation of Specification/Report to Tsg: Tr 38.840v2.0. 0," 3GPP Tsg-Ran Meeting #84, RP-191083, Jun. 2019.
EPO, Extended European Search Report for EP Application No. 20935841.5, May 24, 2023.
MediaTek Inc., "Configurations for RRM Measurement Relaxation in NR," 3GPP TSG-RAN WG2 Meeting #109 electronic, R2-2000312, Feb. 2020.
WIPO, International Search Report and Written Opinion for International Application No. PCT/CN2020/090090, Feb. 20, 2021.
EPO, Communication for EP Application No. 20935841.5, Mar. 12, 2025.

* cited by examiner

METHOD FOR MEASUREMENT-RELAXATION REQUIREMENT DETERMINATION AND TERMINAL DEVICE

CROSS-REFERENCE TO RELATED APPLICATION(S)

This application is a continuation of PCT/CN2020/090090, filed May 13, 2020, the entire disclosure of which is hereby incorporated by reference.

TECHNICAL FIELD

This application relates to the field of wireless communication technology, and particularly to a method for measurement-relaxation requirement determination and a terminal device.

RELATED ART

In the related art, in case two measurement-relaxation criteria are configured by a network device, behavior of a terminal device regarding measurement relaxation on a neighbor cell has not yet been determined.

SUMMARY

In a first aspect, a method for measurement-relaxation requirement determination is provided in implementations of the disclosure. The method includes the following. If a measurement result of a serving cell fulfills both a first measurement-relaxation criterion and a second measurement-relaxation criterion, a terminal device determines, based on first information, a measurement requirement for performing measurement relaxation on a neighbor cell. The first information includes at least one of: first indication information transmitted by a network device, a measurement requirement specified in a protocol, a first measurement requirement corresponding to the first measurement-relaxation criterion and a second measurement requirement corresponding to the second measurement-relaxation criterion, or a period in which the measurement result of a serving cell fulfills the first measurement-relaxation criterion and a period in which the measurement result of a serving cell fulfills the second measurement-relaxation criterion.

In a second aspect, a method for measurement-relaxation requirement determination is provided in implementations of the disclosure. The method includes the following. A network device transmits fourth indication information. The fourth indication information is used for a terminal device to determine a measurement requirement for performing measurement relaxation on a neighbor cell.

In a third aspect, a terminal device is provided in implementations of the disclosure. The terminal device includes a processor and a memory. The processor is configured to execute computer programs stored in the memory to determine, based on first information, a measurement requirement for performing measurement relaxation on a neighbor cell, if a measurement result of a serving cell fulfills both a first measurement-relaxation criterion and a second measurement-relaxation criterion. The first information includes at least one of: first indication information transmitted by a network device, a measurement requirement specified in a protocol, a first measurement requirement corresponding to the first measurement-relaxation criterion and a second measurement requirement corresponding to the second measurement-relaxation criterion, or a period in which the measurement result of a serving cell fulfills the first measurement-relaxation criterion and a period in which the measurement result of a serving cell fulfills the second measurement-relaxation criterion.

DETAILED DESCRIPTION

Figure 1:
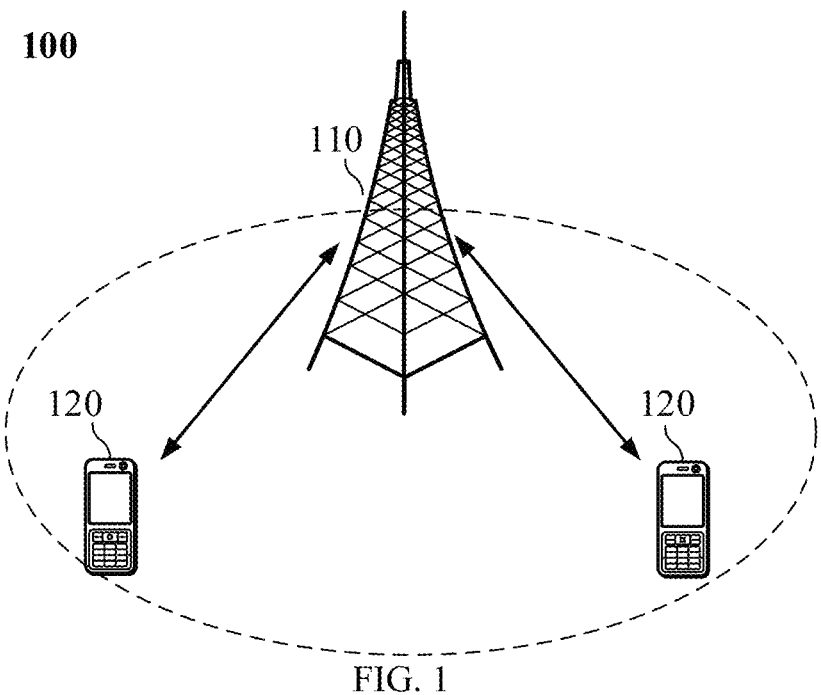
FIG. 1 is a schematic structural diagram of a communication system according to implementations of the disclosure.

In order for better understanding of the features and technical contents of implementations of the disclosure, the implementation process of the implementations of the disclosure will be described in detail below with reference to the accompanying drawings. The accompanying drawings herein are merely intended for illustration rather than limitation of implementations of the disclosure.

Currently, with people's pursuit of speed, low latency, high-speed mobility and energy efficiency, and diversity and complexity of services in future life, the 3rd generation partnership project (3GPP) international standard organization began develop $5^{th}$ generation (5G). 5G is mainly applied to: enhanced mobile broadband (eMBB), ultra-reliable low-latency communications (URLLC), and massive machine-type communications (mMTC).

eMBB is still aimed at obtaining multimedia content, services, and data for users and grows rapidly in demand. On the other hand, because eMBB may be deployed in different scenarios, such as indoor, urban, rural areas, etc., its capabilities and requirements vary widely. Therefore, analysis of eMBB should depend on specific deployment scenarios. URLLC is typically applied to: industrial automation, power automation, telemedicine operations, traffic safety assurance, etc. mMTC is typically characterized by: high connection density, small amount of data, delay-insensitive services, low cost of modules, long service life, etc.

A new radio (NR) system can also be deployed separately. In order to reduce air interface signaling, recover wireless connections and recover data services quickly, a new radio resource control (RRC) state is defined, namely RRC-inactive state. In an RRC-idle state, mobility is terminal device-based cell reselection, paging is initiated by a core network (CN), and a paging area is configured by the CN. There is no terminal context and no RRC connection at a network device side. In the RRC-inactive state, the mobility is terminal device-based cell reselection, there is a connection between the CN and an NR, there is a terminal context on a network device, and paging is triggered by a radio access network (RAN). Since a RAN paging area is managed by the RAN, the network device can know that the location of a terminal device is based on the RAN paging area.

For the terminal device in the RRC-idle state and the RRC-inactive state, measurement on a serving cell is performed continuously, and measurement behavior on a neighbor cell in the RRC-idle state and the RRC-inactive state is constrained by related parameters in a system broadcast message.

In terms of whether to start intra-frequency measurement, if a serving cell fulfills Srxlev>SIntraSearchP and Squal>SIntraSearchQ, intra-frequency neighbor-cell measurement will not be started; otherwise, intra-frequency neighbor-cell measurement will be started. For equal-priority or lower-priority inter-frequency measurement, if the serving cell fulfills Srxlev>SnonIntraSearchP and Squal>SnonIntraSearchQ, equal-priority or lower-priority inter-frequency measurement will not be started; otherwise, equal-priority or lower-priority inter-frequency measurement will be started. For higher-priority inter-frequency measurement, higher-priority inter-frequency measurement will always be started. A frequency priority may be configured via system message signaling, or may be carried by an RRC release message. In this case, the network device will configure a dedicated frequency priority for the terminal device. After the dedicated frequency priority is received by the terminal device, public frequency-priority information broadcast by a system message will be covered.

Power saving technologies have been introduced in the NR system. For radio resource management (RRM) measurement by the terminal device, two criteria are defined, namely not-cell-edge criterion and low-mobility criterion. If the two criteria are both configured, the network device further indicates to the terminal device whether the two criteria are in an "and" relationship or are in an "or" relationship. The not-cell-edge criterion mainly defines a reference signal receiving power (RSRP) threshold. If a measurement value of an RSRP of a serving cell is greater than the threshold, the terminal device can perform RRM measurement relaxation on a neighbor cell. The low-mobility criterion means that if the RSRP of the serving cell varies slightly, it represents that the terminal device has little demand on cell reselection, and therefore, RRM measurement relaxation can be performed on the neighbor cell, thereby realizing power saving of the terminal device.

If s-SearchDeltaP is configured in the system message, it represents that the serving cell supports the terminal device to relax measurement on the neighbor cell. If a condition for measurement relaxation on the neighbor cell has been met by a measurement result of the RSRP of the serving cell for a period of TSearchDeltaP, the terminal device can perform measurement relaxation on the neighbor cell.

A condition for measurement relaxation is (SrxlevRef−Srxlev)<s-SearchDeltaP.

Srxlev is a current Srxlev value of the serving cell, and SrxlevRef is a reference Srxlev value of the serving cell.

After a user equipment (UE) selects or reselects a new cell, or if (Srxlev−SrxlevRef)>0, or if the condition for measurement relaxation has not been met for TSearchDeltaP, the UE will set the value of SrxlevRef to the current Srxlev value of the serving cell.

For measurement relaxation on the neighbor cell, there may be three scenarios: a low-mobility scenario, a not-cell-edge scenario, and a low-mobility and not-at-cell-edge scenario. Regarding the three scenarios above, different requirements on measurement relaxation can be defined. One possible scheme is to define a longer measurement interval, for example, introduce a multiplication factor to an existing measurement interval to expand the measurement interval. Another possible scheme is that the terminal device skips measurement.

A measurement interval for the low-mobility scenario may be different from a measurement interval for the not-cell-edge scenario. For example, a multiplication factor for the low-mobility scenario is 4, and a multiplication factor for the not-cell-edge scenario is 2.

In case the not-cell-edge criterion and the low-mobility criterion are configured for the terminal device by the network device, if both the not-cell-edge criterion and the low-mobility criterion are fulfilled, which measurement-relaxation requirement will be adopted by the terminal device to perform measurement on a neighbor cell has not yet been determined.

Implementations of the disclosure provide a method for measurement-relaxation requirement determination. The method of implementations of the disclosure can be applied to various communication systems, for example, a global system of mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, an advanced LTE (LTE-A) system, an NR system, an evolved system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, a wireless local area networks (WLAN), a wireless fidelity (WiFi), a next-generation communication system, or other communication systems, etc.

Generally speaking, a conventional communication system supports a limited quantity of connections and therefore is easy to implement. However, with development of communication technology, a mobile communication system will not only support conventional communication but also support, for example, device to device (D2D) communication, machine to machine (M2M) communication, MTC, vehicle to vehicle (V2V) communication, etc. Implementations of the disclosure can also be applied to these communication systems.

The system architecture and service scenario described in implementations of the disclosure are merely intended for describing more clearly technical solutions of implementations of the disclosure, and do not constitute limitation on the technical solutions provided in implementations of the disclosure. Those of ordinary skill in the art can appreciate that, with evolution of network architectures and emergence of new service scenarios, for similar technical problems, the technical solutions provided in implementations of the disclosure can also be applied.

The network device in implementations of the disclosure may be a common base station (such as NodeB, eNB, or gNB), an NR controller, a centralized unit, an NR base station, a remote radio module, a micro base station, a relay, a distributed unit, a transmission reception point (TRP), a transmission point (TP), or any other device. The technology and form adopted by the network device are not limited in implementations of the disclosure. For the convenience of illustration, in all implementations of the disclosure, the above devices that can provide wireless communication functions for a terminal device are collectively referred to as "network device".

In implementations of the disclosure, the terminal device may be any terminal, for example, the terminal device may be a UE for MTC. In other words, the terminal device may also be referred to as UE, mobile station (MS), mobile terminal, terminal, etc. The terminal device can communicate with one or more CNs via a RAN. For example, the terminal device can be a mobile phone (or referred to as "cellular" phone), a computer with mobile terminal, etc. For example, the terminal device can also be a portable, pocket-sized, handheld, computer built-in, or in-vehicle mobile device that exchanges language and/or data with the RAN. Implementations of the disclosure are not limited in this regard.

Optionally, the network device and the terminal device can be deployed on land, which includes indoor or outdoor, handheld, or in-vehicle. The network device and the terminal device can also be deployed on water. The network device and the terminal device can also be deployed in airplanes, balloons, and satellites in the air. There is no limitation on the application scenario of the network device and the terminal device in implementations of the disclosure.

Optionally, communication between the network device and the terminal device and communication between terminal devices may be implemented in a licensed spectrum, in an unlicensed spectrum, or in both the licensed spectrum and the unlicensed spectrum. The communication between the network device and the terminal device and the communication between the terminal devices may be implemented in a spectrum below 7 gigahertz (GHz), in a spectrum above 7 GHz, or in both the spectrum below 7 GHz and the spectrum above 7 GHz. There is no limitation on a spectrum resource used between the network device and the terminal device in implementations of the disclosure.

Generally speaking, a conventional communication system supports a limited quantity of connections and therefore is easy to implement. However, with development of communication technology, a mobile communication system will not only support conventional communication but also support, for example, D2D communication, M2M communication, MTC, V2V communication, etc. Implementations of the disclosure can also be applied to these communication systems.

Exemplarily, FIG. 1 illustrates a communication system 100 to which implementations of the disclosure are applied. The communication system 100 may include a network device 110. The network device 110 may be a device that can communicate with a terminal device 120 (also referred to as "communication terminal" or "terminal"). The network device 110 can provide a communication coverage for a specific geographical area and communicate with terminal devices in the coverage area. Optionally, the network device 110 may be a base transceiver station (BTS) in a GSM or a CDMA system, a NodeB (NB) in a WCDMA system, an evolutional Node B (eNB or eNodeB) in an LTE system, or may be a radio controller in a cloud radio access network (CRAN). Or the network device may be a mobile switching center, a relay station, an access point, an in-vehicle device, a wearable device, a hub, a switch, a bridge, a router, a network-side device in a 5G network, or a network device in a future evolved public land mobile network (PLMN), etc.

The communication system 100 further includes at least one terminal device 120 located in the coverage area of the network device 110. The "terminal device" used herein includes but is not limited to a device configured to communicate via a wired line, another data connection/network, a wireless interface, a device which is part of another terminal device and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a WLAN, a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal". Examples of the mobile terminal may include, but are not limited to, a satellite telephone or cellular telephone, a personal communication system (PCS) terminal integrated with functions of cellular radio telephone, data processing, fax, and data communication, a personal digital assistant (PDA) equipped with radio telephone, pager, Internet/Intranet access, web browser, notebook, calendar, and/or global positioning system (GPS) receiver, and a conventional laptop and/or a handheld receiver, or other electronic devices equipped with a radio telephone transceiver. The terminal device may refer to an access terminal, a UE, a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in a 5G network, a terminal device in a future evolved PLMN, etc.

Optionally, terminal devices 120 can communicate with each other through D2D communication.

Optionally, the 5G system or 5G network can also be referred to as an NR system or NR network.

FIG. 1 exemplarily illustrates one network device and two terminal devices. Optionally, the communication system 100 may also include multiple network devices, and there can be other quantities of terminal devices in a coverage area of each of the network devices. Implementations of the disclosure are not limited in this regard.

Optionally, the communication system 100 may further include other network entities such as a network controller, a mobile management entity, or the like, and implementations of the disclosure are not limited in this regard.

It should be understood that, in implementations of the disclosure, a device with communication functions in a network/system can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be elaborated again herein. The communication device may further include other devices such as a network controller, a mobile management entity, or other network entities in the communication system 100. Implementations of the disclosure are not limited in this regard.

In order to solve the technical problem described in the related art, implementations of the disclosure provide a method for measurement-relaxation requirement determination, an electronic device, and a storage medium, which determine behavior of a terminal device regarding measurement relaxation on a neighbor cell when two measurement-relaxation criteria are configured by a network device.

Figure 2:
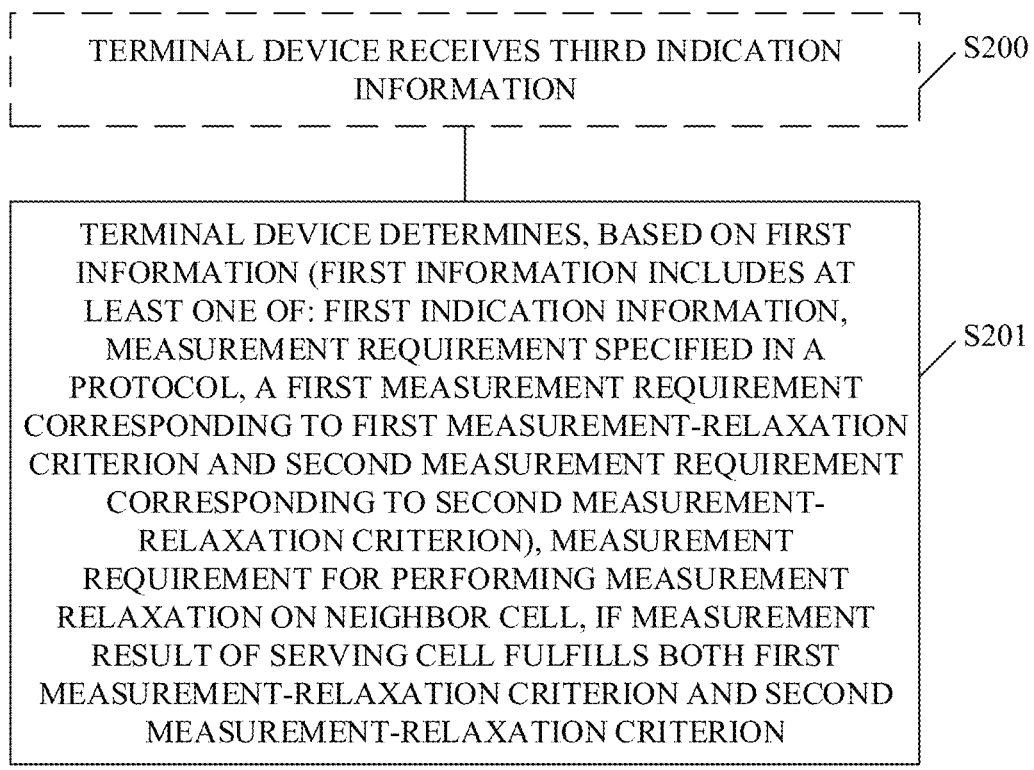
FIG. 2 is a schematic diagram illustrating a possible procedure of a method for measurement-relaxation requirement determination provided in implementations of the disclosure.

FIG. 2 illustrates a possible procedure of a method for measurement-relaxation requirement determination provided in implementations of the disclosure. The method includes the following.

Step S201, if a measurement result of a serving cell fulfills both a first measurement-relaxation criterion and a second measurement-relaxation criterion, a terminal device determines, based on first information, a measurement requirement for performing measurement relaxation on a neighbor cell.

In some implementations, the first information includes at least one of: first indication information transmitted by a network device, a measurement requirement specified in a protocol, a first measurement requirement corresponding to the first measurement-relaxation criterion and a second measurement requirement corresponding to the second measurement-relaxation criterion, or a period in which the measurement result of a serving cell fulfills the first measurement-relaxation criterion and a period in which the measurement result of a serving cell fulfills the second measurement-relaxation criterion.

In some implementations, the first measurement-relaxation criterion is a low-mobility criterion, and the second measurement-relaxation criterion is a not-cell-edge criterion. Or the first measurement-relaxation criterion is the not-cell-edge criterion, and the second measurement-relaxation criterion is the low-mobility criterion.

In some implementations, if the first information includes the first indication information transmitted by the network device, the first indication information can indicate that if the measurement result of a serving cell fulfills both the first measurement-relaxation criterion and the second measurement-relaxation criterion, the measurement requirement for performing measurement relaxation on a neighbor cell is a measurement requirement corresponding to a longer measurement interval among the first measurement-relaxation criterion and the second measurement-relaxation criterion. In this scenario, the terminal device determines (or compares) a first measurement interval corresponding to the first measurement-relaxation criterion and a second measurement interval corresponding to the second measurement-relaxation criterion, and determines, according to the first indication information, that the measurement requirement for performing measurement relaxation on a neighbor cell is a measurement requirement corresponding to a longer measurement interval. If the first measurement interval corresponding to the first measurement requirement corresponding to the first measurement-relaxation criterion is longer than the second measurement interval corresponding to the second measurement requirement corresponding to the second measurement-relaxation criterion, the terminal device determines, according to the first indication information, that the measurement requirement for performing measurement relaxation on a neighbor cell is the first measurement requirement. If the second measurement interval corresponding to the second measurement requirement corresponding to the second measurement-relaxation criterion is longer than the first measurement interval corresponding to the first measurement requirement corresponding to the first measurement-relaxation criterion, the terminal device determines, according to the first indication information, that the measurement requirement for performing measurement relaxation on a neighbor cell is the second measurement requirement. If the second measurement interval corresponding to the second measurement requirement corresponding to the second measurement-relaxation criterion is equal to the first measurement interval corresponding to the first measurement requirement corresponding to the first measurement-relaxation criterion, the terminal device determines that the measurement requirement for performing measurement relaxation on a neighbor cell is any one of the first measurement requirement and the second measurement requirement.

In some implementations, if the first information includes the first indication information transmitted by the network device, the first indication information can further indicate that if the measurement result of a serving cell fulfills both the first measurement-relaxation criterion and the second measurement-relaxation criterion, the measurement requirement for performing measurement relaxation on a neighbor cell is the first measurement requirement corresponding to the first measurement-relaxation criterion. Or the first indication information can further indicate that if the measurement result of a serving cell fulfills both the first measurement-relaxation criterion and the second measurement-relaxation criterion, the measurement requirement for performing measurement relaxation on a neighbor cell is the second measurement requirement corresponding to the second measurement-relaxation criterion. In this scenario, if the measurement result of a serving cell fulfills both the first measurement-relaxation criterion and the second measurement-relaxation criterion, and the first indication information indicates that the measurement requirement for performing measurement relaxation on a neighbor cell is the first measurement requirement corresponding to the first measurement-relaxation criterion, the terminal device determines, according to the first indication information, that the measurement requirement for performing measurement relaxation on a neighbor cell is the first measurement requirement. If the measurement result of a serving cell fulfills both the first measurement-relaxation criterion and the second measurement-relaxation criterion, and the first indication information indicates that the measurement requirement for performing measurement relaxation on a neighbor cell is the second measurement requirement corresponding to the second measurement-relaxation criterion, the terminal device determines, according to the first indication information, that the measurement requirement for performing measurement relaxation on a neighbor cell is the second measurement requirement.

In some implementations, if the first information includes the measurement requirement specified in a protocol, the measurement requirement specified in a protocol includes the following. If the measurement result of a serving cell fulfills both the first measurement-relaxation criterion and the second measurement-relaxation criterion, the measurement requirement for performing measurement relaxation on a neighbor cell is the first measurement requirement, or if the measurement result of a serving cell fulfills both the first measurement-relaxation criterion and the second measurement-relaxation criterion, the measurement requirement for performing measurement relaxation on a neighbor cell is the second measurement requirement. In this scenario, if the measurement requirement specified in a protocol is the first measurement requirement, the terminal device determines that the measurement requirement for performing measurement relaxation on a neighbor cell is the first measurement requirement. If the measurement requirement specified in a protocol is the second measurement requirement, the terminal device determines that the measurement requirement for performing measurement relaxation on a neighbor cell is the second measurement requirement.

In some implementations, if the first information includes the first measurement requirement corresponding to the first measurement-relaxation criterion and the second measurement requirement corresponding to the second measurement-relaxation criterion, the terminal device determines a first measurement interval corresponding to the first measurement requirement corresponding to the first measurement-relaxation criterion and a second measurement interval corresponding to the second measurement requirement corresponding to the second measurement-relaxation criterion, and determines that the measurement requirement for performing measurement relaxation on a neighbor cell is a measurement requirement corresponding to a longer measurement interval. In this scenario, if the first measurement interval corresponding to the first measurement requirement corresponding to the first measurement-relaxation criterion is longer than the second measurement interval corresponding to the second measurement requirement corresponding to the second measurement-relaxation criterion, the terminal device determines that the measurement requirement for performing measurement relaxation on a neighbor cell is the first measurement requirement. If the second measurement interval corresponding to the second measurement requirement corresponding to the second measurement-relaxation criterion is longer than the first measurement interval corresponding to the first measurement requirement corresponding to the first measurement-relaxation criterion, the terminal device determines that the measurement requirement for performing measurement relaxation on a neighbor cell is the second measurement requirement.

In some implementations, if the first information includes the period in which the measurement result of a serving cell fulfills the first measurement-relaxation criterion and the period in which the measurement result of a serving cell fulfills the second measurement-relaxation criterion, the terminal device determines that the measurement requirement for performing measurement relaxation on a neighbor cell is a measurement requirement corresponding to a measurement-relaxation criterion that is fulfilled earlier by the measurement result of a serving cell.

In this scenario, if the measurement result of a serving cell fulfills the first measurement-relaxation criterion earlier, and the measurement result of a serving cell fulfills the second measurement-relaxation criterion in the period in which the measurement result of a serving cell fulfills the first measurement-relaxation criterion, the terminal device determines that the measurement requirement for performing measurement relaxation on a neighbor cell is the first measurement requirement. Or if the measurement result of a serving cell fulfills the second measurement-relaxation criterion earlier, and the measurement result of a serving cell fulfills the first measurement-relaxation criterion in the period in which the measurement result of a serving cell fulfills the second measurement-relaxation criterion, the terminal device determines that the measurement requirement for performing measurement relaxation on a neighbor cell is the second measurement requirement. Or the terminal device determines, according to second indication information transmitted by the network device, the measurement requirement for performing measurement relaxation on a neighbor cell. On condition that the second indication information indicates that the measurement requirement for performing measurement relaxation on a neighbor cell is the first measurement requirement if the first measurement-relaxation criterion is fulfilled by the measurement result of a serving cell as early as the second measurement-relaxation criterion, the terminal device determines that the measurement requirement for performing measurement relaxation on a neighbor cell is the first measurement requirement. Or on condition that the second indication information indicates that the measurement requirement for performing measurement relaxation on a neighbor cell is the second measurement requirement if the first measurement-relaxation criterion is fulfilled by the measurement result of a serving cell as early as the second measurement-relaxation criterion, the terminal device determines that the measurement requirement for performing measurement relaxation on a neighbor cell is the second measurement requirement.

In some implementations, the method may further include the following.

Step S200, the terminal device receives third indication information. The third indication information indicates that if the measurement result of a serving cell fulfills any one of the first measurement-relaxation criterion and the second measurement-relaxation criterion, the terminal device determines whether the measurement result of a serving cell fulfills the other one of the first measurement-relaxation criterion and the second measurement-relaxation criterion.

Figure 3:
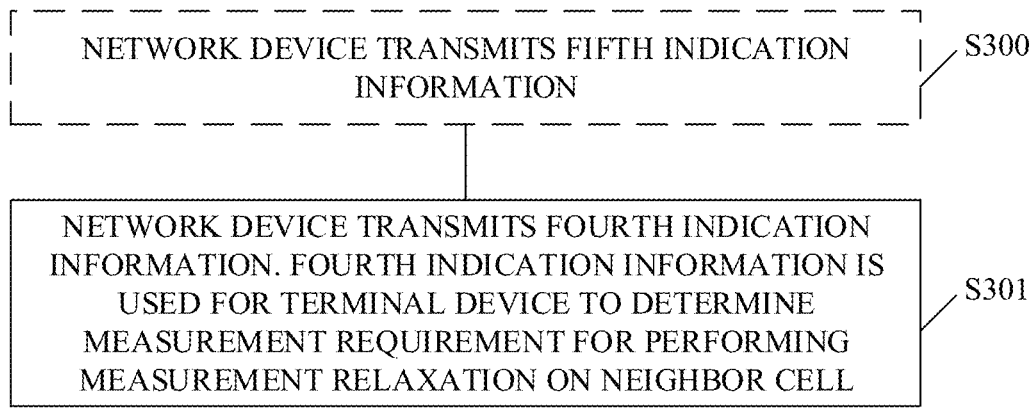
FIG. 3 is a schematic diagram illustrating another possible procedure of a method for measurement-relaxation requirement determination provided in implementations of the disclosure.

FIG. 3 illustrates another possible procedure of a method for measurement-relaxation requirement determination provided in implementations of the disclosure. The method includes the following.

Step S301, a network device transmits fourth indication information. The fourth indication information is used for a terminal device to determine a measurement requirement for performing measurement relaxation on a neighbor cell.

In some implementations, the fourth indication information indicates that if a measurement result of a serving cell fulfills both a first measurement-relaxation criterion and a second measurement-relaxation criterion, the measurement requirement for performing measurement relaxation on a neighbor cell is a measurement requirement corresponding to a longer measurement interval among the first measurement-relaxation criterion and the second measurement-relaxation criterion.

In other implementations, the fourth indication information indicates that if a measurement result of a serving cell fulfills both a first measurement-relaxation criterion and a second measurement-relaxation criterion, the measurement requirement for performing measurement relaxation on a neighbor cell is a first measurement requirement corresponding to the first measurement-relaxation criterion. Or the fourth indication information indicates that if the measurement result of a serving cell fulfills both the first measurement-relaxation criterion and the second measurement-relaxation criterion, the measurement requirement for performing measurement relaxation on a neighbor cell is a second measurement requirement corresponding to the second measurement-relaxation criterion.

In other implementations, the fourth indication information indicates that if a first measurement-relaxation criterion is fulfilled by a measurement result of a serving cell as early as a second measurement-relaxation criterion, the measurement requirement for performing measurement relaxation on a neighbor cell is a first measurement requirement corresponding to the first measurement-relaxation criterion. Or the fourth indication information indicates that if the first measurement-relaxation criterion is fulfilled by the measurement result of a serving cell as early as the second measurement-relaxation criterion, the measurement requirement for performing measurement relaxation on a neighbor cell is a second measurement requirement corresponding to the second measurement-relaxation criterion.

In some implementations, the method may further include the following.

Step S300, the network device transmits fifth indication information. The fifth indication information indicates that if the measurement result of a serving cell fulfills any one of the first measurement-relaxation criterion and the second measurement-relaxation criterion, the terminal device determines whether the measurement result of a serving cell fulfills the other one of the first measurement-relaxation criterion and the second measurement-relaxation criterion.

In some implementations, the first measurement-relaxation criterion is a low-mobility criterion, and the second measurement-relaxation criterion is a not-cell-edge criterion. Or the first measurement-relaxation criterion is the not-cell-edge criterion, and the second measurement-relaxation criterion is the low-mobility criterion.

The method provided in implementations of the disclosure will be described in detail below in connection with different scenarios.

Figure 4:
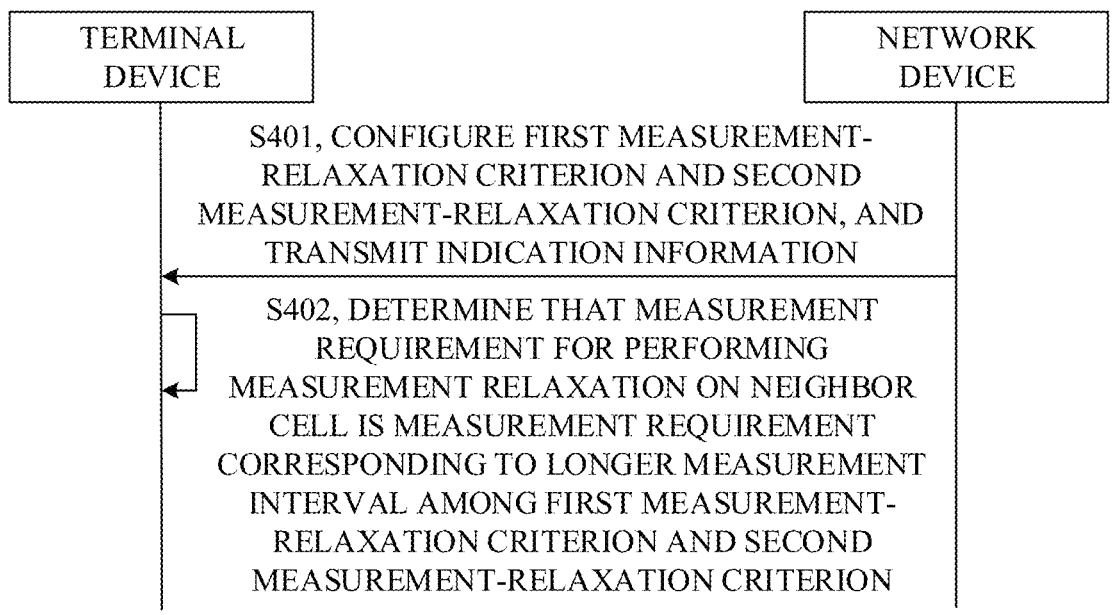
FIG. 4 is a schematic diagram illustrating a detailed procedure of a method for measurement-relaxation requirement determination according to implementations of the disclosure.

FIG. 4 illustrates a detailed procedure of a method for measurement-relaxation requirement determination provided in implementations of the disclosure. The method includes the following.

Step S401, a network device configures a first measurement-relaxation criterion and a second measurement-relaxation criterion for a terminal device, and transmits indication information to the terminal device.

The indication information indicates that if a measurement result of a serving cell fulfills any one of the first measurement-relaxation criterion and the second measurement-relaxation criterion, the terminal device determines whether the measurement result of a serving cell fulfills the other one of the first measurement-relaxation criterion and the second measurement-relaxation criterion.

Here, the indication information may be the third indication information in step S200, or may be the fifth indication information in step S300.

Step S402, if the measurement result of a serving cell fulfills both the first measurement-relaxation criterion and the second measurement-relaxation criterion, the terminal device determines that a measurement requirement for performing measurement relaxation on a neighbor cell is a measurement requirement corresponding to a longer measurement interval among the first measurement-relaxation criterion and the second measurement-relaxation criterion.

In some implementations, the terminal device receives first indication information transmitted by the network device. The first indication information can indicate that if the measurement result of a serving cell fulfills both the first measurement-relaxation criterion and the second measurement-relaxation criterion, the measurement requirement for performing measurement relaxation on a neighbor cell is a measurement requirement corresponding to a longer measurement interval among the first measurement-relaxation criterion and the second measurement-relaxation criterion.

In this scenario, the terminal device determines a first measurement interval corresponding to the first measurement-relaxation criterion and a second measurement interval corresponding to the second measurement-relaxation criterion, and determines that the measurement requirement for performing measurement relaxation on a neighbor cell is a measurement requirement corresponding to a longer measurement interval. If the first measurement interval corresponding to the first measurement requirement corresponding to the first measurement-relaxation criterion is longer than the second measurement interval corresponding to the second measurement requirement corresponding to the second measurement-relaxation criterion, the terminal device determines, according to the first indication information, that the measurement requirement for performing measurement relaxation on a neighbor cell is the first measurement requirement. If the second measurement interval corresponding to the second measurement requirement corresponding to the second measurement-relaxation criterion is longer than the first measurement interval corresponding to the first measurement requirement corresponding to the first measurement-relaxation criterion, the terminal device determines, according to the first indication information, that the measurement requirement for performing measurement relaxation on a neighbor cell is the second measurement requirement.

In other implementations, the measurement requirement for performing measurement relaxation on a neighbor cell by the terminal device is neither indicated by the network device nor specified in a protocol. In this scenario, the terminal device determines a first measurement interval corresponding to the first measurement-relaxation criterion and a second measurement interval corresponding to the second measurement-relaxation criterion, and determines that the measurement requirement for performing measurement relaxation on a neighbor cell is a measurement requirement corresponding to a longer measurement interval. If the first measurement interval corresponding to the first measurement requirement corresponding to the first measurement-relaxation criterion is longer than the second measurement interval corresponding to the second measurement requirement corresponding to the second measurement-relaxation criterion, the terminal device determines that the measurement requirement for performing measurement relaxation on a neighbor cell is the first measurement requirement. If the second measurement interval corresponding to the second measurement requirement corresponding to the second measurement-relaxation criterion is longer than the first measurement interval corresponding to the first measurement requirement corresponding to the first measurement-relaxation criterion, the terminal device determines that the measurement requirement for performing measurement relaxation on a neighbor cell is the second measurement requirement. If the second measurement interval corresponding to the second measurement requirement corresponding to the second measurement-relaxation criterion is equal to the first measurement interval corresponding to the first measurement requirement corresponding to the first measurement-relaxation criterion, the terminal device determines that the measurement requirement for performing measurement relaxation on a neighbor cell is any one of the first measurement requirement and the second measurement requirement.

In the two scenarios above, if the second measurement interval corresponding to the second measurement requirement corresponding to the second measurement-relaxation criterion is equal to the first measurement interval corresponding to the first measurement requirement corresponding to the first measurement-relaxation criterion, the terminal device determines that the measurement requirement for performing measurement relaxation on a neighbor cell is any one of the first measurement requirement and the second measurement requirement.

As such, measurement relaxation is performed on a neighbor cell based on the measurement requirement corresponding to a longer measurement interval, which is possible to reduce power consumption of the terminal device. In addition, the measurement requirement for performing measurement relaxation on a neighbor cell is determined according to the first indication information transmitted by the network device, such that the network device and the terminal device can reach an agreement regarding measurement relaxation on a neighbor cell.

In some implementations, the first measurement-relaxation criterion is a low-mobility criterion, and the second measurement-relaxation criterion is a not-cell-edge criterion. Or the first measurement-relaxation criterion is the not-cell-edge criterion, and the second measurement-relaxation criterion is the low-mobility criterion.

Figure 5:
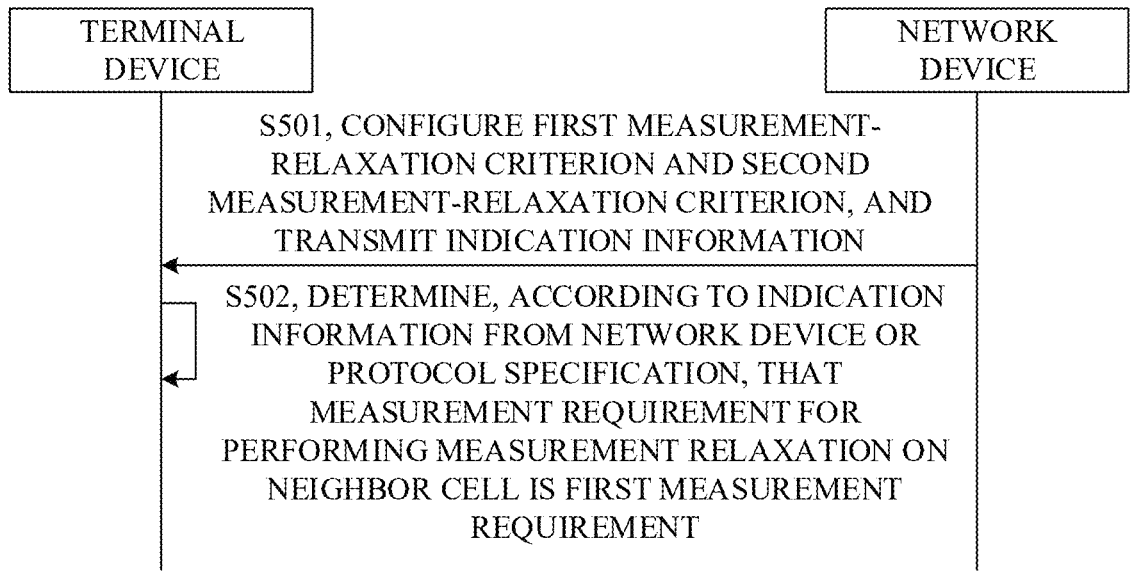
FIG. 5 is a schematic diagram illustrating another detailed procedure of a method for measurement-relaxation requirement determination according to implementations of the disclosure.

FIG. 5 illustrates another detailed procedure of a method for measurement-relaxation requirement determination provided in implementations of the disclosure. The method includes the following.

Step S501, a network device configures a first measurement-relaxation criterion and a second measurement-relaxation criterion for a terminal device, and transmits indication information to the terminal device.

In some implementations, the first measurement-relaxation criterion is a low-mobility criterion, and the second measurement-relaxation criterion is a not-cell-edge criterion.

The indication information indicates that if a measurement result of a serving cell fulfills any one of the first measurement-relaxation criterion and the second measurement-relaxation criterion, the terminal device determines whether the measurement result of a serving cell fulfills the other one of the first measurement-relaxation criterion and the second measurement-relaxation criterion.

Here, the indication information may be the third indication information in step S200, or may be the fifth indication information in step S300.

Step S502, if the measurement result of a serving cell fulfills both the first measurement-relaxation criterion and the second measurement-relaxation criterion, the terminal device determines, according to the indication information from the network device or protocol specification, that a measurement requirement for performing measurement relaxation on a neighbor cell is a first measurement requirement.

In some implementations, the first measurement requirement is a first measurement requirement corresponding to the first measurement-relaxation criterion.

In some implementations, the indication information may be the first indication information in step S201. The first indication information indicates that if the measurement result of a serving cell fulfills both the first measurement-relaxation criterion and the second measurement-relaxation criterion, the measurement requirement for performing measurement relaxation on a neighbor cell is the first measurement requirement corresponding to the first measurement-relaxation criterion. In this scenario, the terminal device determines, according to the first indication information, that the measurement requirement for performing measurement relaxation on a neighbor cell is the first measurement requirement corresponding to the first measurement-relaxation criterion, on condition that the first indication information indicates that if the measurement result of a serving cell fulfills both the first measurement-relaxation criterion and the second measurement-relaxation criterion, the measurement requirement for performing measurement relaxation on a neighbor cell is the first measurement requirement.

In other implementations, a measurement requirement specified in a protocol includes the following. If the measurement result of a serving cell fulfills both the first measurement-relaxation criterion and the second measurement-relaxation criterion, the measurement requirement for performing measurement relaxation on a neighbor cell is the first measurement requirement. In this scenario, the terminal device determines, according to the protocol specification, that the measurement requirement for performing measurement relaxation on a neighbor cell is the first measurement requirement corresponding to the first measurement-relaxation criterion, on condition that the first indication information indicates that if the measurement result of a serving cell fulfills both the first measurement-relaxation criterion and the second measurement-relaxation criterion, the measurement requirement for performing measurement relaxation on a neighbor cell is the first measurement requirement.

Figure 6:
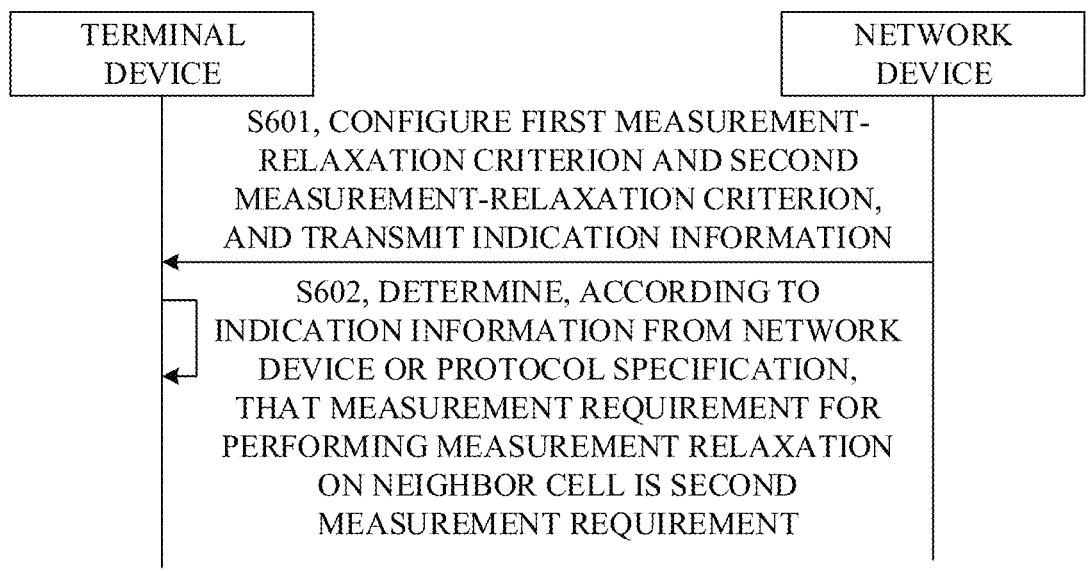
FIG. 6 is a schematic diagram illustrating another detailed procedure of a method for measurement-relaxation requirement determination according to implementations of the disclosure.

FIG. 6 illustrates another detailed procedure of a method for measurement-relaxation requirement determination provided in implementations of the disclosure. The method includes the following.

Step S601, a network device configures a first measurement-relaxation criterion and a second measurement-relaxation criterion for a terminal device, and transmits indication information to the terminal device.

In some implementations, the first measurement-relaxation criterion is a low-mobility criterion, and the second measurement-relaxation criterion is a not-cell-edge criterion.

The indication information indicates that if a measurement result of a serving cell fulfills any one of the first measurement-relaxation criterion and the second measurement-relaxation criterion, the terminal device determines whether the measurement result of a serving cell fulfills the other one of the first measurement-relaxation criterion and the second measurement-relaxation criterion.

Here, the indication information may be the third indication information in step S200, or may be the fifth indication information in step S300.

Step S602, if the measurement result of a serving cell fulfills both the first measurement-relaxation criterion and the second measurement-relaxation criterion, the terminal device determines, according to the indication information from the network device or protocol specification, that a measurement requirement for performing measurement relaxation on a neighbor cell is a second measurement requirement.

In some implementations, the second measurement requirement is a second measurement requirement corresponding to the second measurement-relaxation criterion.

In some implementations, the indication information may be the first indication information in step S201. The first indication information indicates that if the measurement result of a serving cell fulfills both the first measurement-relaxation criterion and the second measurement-relaxation criterion, the measurement requirement for performing measurement relaxation on a neighbor cell is the second measurement requirement corresponding to the second measurement-relaxation criterion. In this scenario, if the measurement result of a serving cell fulfills both the first measurement-relaxation criterion and the second measurement-relaxation criterion, the terminal device determines, according to the first indication information, that the measurement requirement for performing measurement relaxation on a neighbor cell is the second measurement requirement.

In other implementations, a measurement requirement specified in a protocol includes the following. If the measurement result of a serving cell fulfills both the first measurement-relaxation criterion and the second measurement-relaxation criterion, the measurement requirement for performing measurement relaxation on a neighbor cell is the second measurement requirement. In this scenario, if the measurement result of a serving cell fulfills both the first measurement-relaxation criterion and the second measurement-relaxation criterion, the terminal device determines, according to the protocol specification, that the measurement requirement for performing measurement relaxation on a neighbor cell is the second measurement requirement.

Figure 7:
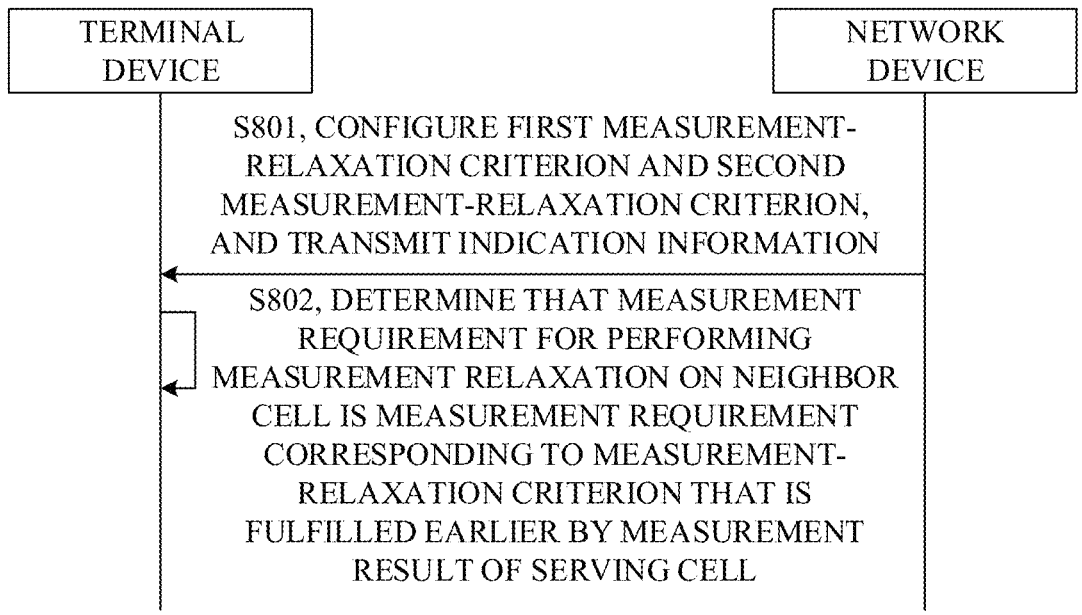
FIG. 7 is a schematic diagram illustrating another detailed procedure of a method for measurement-relaxation requirement determination according to implementations of the disclosure.

FIG. 7 illustrates another detailed procedure of a method for measurement-relaxation requirement determination provided in implementations of the disclosure. The method includes the following.

Step S801, a network device configures a first measurement-relaxation criterion and a second measurement-relaxation criterion for a terminal device, and transmits indication information to the terminal device.

In some implementations, the first measurement-relaxation criterion is a low-mobility criterion, and the second measurement-relaxation criterion is a not-cell-edge criterion.

The indication information indicates that if a measurement result of a serving cell fulfills any one of the first measurement-relaxation criterion and the second measurement-relaxation criterion, the terminal device determines whether the measurement result of a serving cell fulfills the other one of the first measurement-relaxation criterion and the second measurement-relaxation criterion.

Here, the indication information may be the third indication information in step S200, or may be the fifth indication information in step S300.

Step S802, if the measurement result of a serving cell fulfills both the first measurement-relaxation criterion and the second measurement-relaxation criterion, the terminal device determines that a measurement requirement for performing measurement relaxation on a neighbor cell is a measurement requirement corresponding to a measurement-relaxation criterion that is fulfilled earlier by the measurement result of a serving cell.

In some implementations, if the measurement result of a serving cell fulfills the first measurement-relaxation criterion earlier, the terminal device determines that the measurement requirement for performing measurement relaxation on a neighbor cell is a first measurement requirement corresponding to the first measurement-relaxation criterion. If the measurement result of a serving cell fulfills the second measurement-relaxation criterion in the period in which the measurement result of a serving cell fulfills the first measurement-relaxation criterion, the terminal device determines that the measurement requirement for performing measurement relaxation on a neighbor cell is the first measurement requirement. Subsequently, if the measurement result of a serving cell does not fulfill one of the first measurement-relaxation criterion and the second measurement-relaxation criterion, the terminal device determines that the measurement requirement for performing measurement relaxation on a neighbor cell is a measurement requirement corresponding to a measurement-relaxation criterion that is fulfilled by the measurement result of a serving cell.

In other implementations, if the measurement result of a serving cell fulfills the second measurement-relaxation criterion earlier, the terminal device determines that the measurement requirement for performing measurement relaxation on a neighbor cell is a second measurement requirement corresponding to the second measurement-relaxation criterion. If the measurement result of a serving cell fulfills the first measurement-relaxation criterion in the period in which the measurement result of a serving cell fulfills the second measurement-relaxation criterion, the terminal device determines that the measurement requirement for performing measurement relaxation on a neighbor cell is the second measurement requirement. Subsequently, if the measurement result of a serving cell does not fulfill one of the first measurement-relaxation criterion and the second measurement-relaxation criterion, the terminal device determines that the measurement requirement for performing measurement relaxation on a neighbor cell is a measurement requirement corresponding to a measurement-relaxation criterion that is fulfilled by the measurement result of a serving cell.

In other implementations, if the first measurement-relaxation criterion is fulfilled by the measurement result of a serving cell as early as the second measurement-relaxation criterion, the terminal device determines that the measurement requirement for performing measurement relaxation on a neighbor cell is the first measurement requirement or the second measurement requirement.

In other implementations, if the first measurement-relaxation criterion is fulfilled by the measurement result of a serving cell as early as the second measurement-relaxation criterion, the terminal device determines, according to second indication information transmitted by the network device, the measurement requirement for performing measurement relaxation on a neighbor cell. On condition that the second indication information indicates that the measurement requirement for performing measurement relaxation on a neighbor cell is the first measurement requirement if the first measurement-relaxation criterion is fulfilled by the measurement result of a serving cell as early as the second measurement-relaxation criterion, the terminal device determines, according to the second indication information, that the measurement requirement for performing measurement relaxation on a neighbor cell is the first measurement requirement. Or on condition that the second indication information indicates that the measurement requirement for performing measurement relaxation on a neighbor cell is the second measurement requirement if the first measurement-relaxation criterion is fulfilled by the measurement result of a serving cell as early as the second measurement-relaxation criterion, the terminal device determines, according to the second indication information, that the measurement requirement for performing measurement relaxation on a neighbor cell is the second measurement requirement.

In the method provided in implementations of the disclosure, for a scenario in which two relaxation criteria correspond to different measurement requirements, behavior of the terminal device regarding measurement relaxation on a neighbor cell in case the measurement result of a serving cell fulfills both the first measurement-relaxation criterion and the second measurement-relaxation criterion has been determined, which can avoid inconsistency between the network device and the terminal device in understanding of measurement relaxation on a neighbor cell.

Figure 8:
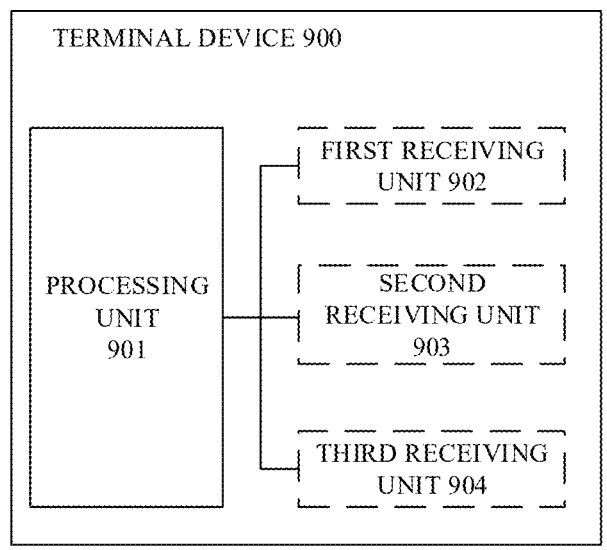
FIG. 8 is a schematic diagram illustrating a possible structure of a terminal device according to implementations of the disclosure.

In order to implement the foregoing method, implementations of the disclosure further provide a terminal device. FIG. 8 is a schematic diagram illustrating a possible structure of the terminal device. The terminal device 900 includes a processing unit 901. The processing unit 901 is configured to determine, based on first information, a measurement requirement for performing measurement relaxation on a neighbor cell, if a measurement result of a serving cell fulfills both a first measurement-relaxation criterion and a second measurement-relaxation criterion. The first information includes at least one of: first indication information transmitted by a network device, a measurement requirement specified in a protocol, a first measurement requirement corresponding to the first measurement-relaxation criterion and a second measurement requirement corresponding to the second measurement-relaxation criterion, or a period in which the measurement result of a serving cell fulfills the first measurement-relaxation criterion and a period in which the measurement result of a serving cell fulfills the second measurement-relaxation criterion.

In some implementations, if the first information includes the first indication information, the terminal device 900 further includes a first receiving unit 902. The first receiving unit 902 is configured to receive the first indication information transmitted by the network device. The first indication information indicates that if the measurement result of a serving cell fulfills both the first measurement-relaxation criterion and the second measurement-relaxation criterion, the measurement requirement for performing measurement relaxation on a neighbor cell is a measurement requirement corresponding to a longer measurement interval among the first measurement-relaxation criterion and the second measurement-relaxation criterion.

In some implementations, the processing unit 901 is configured to determine to perform measurement relaxation on a neighbor cell based on the first measurement requirement, if a first measurement interval corresponding to the first measurement requirement is longer than a second measurement interval corresponding to the second measurement requirement; or determine that the measurement requirement for performing measurement relaxation on a neighbor cell is the second measurement requirement, if the first measurement interval corresponding to the first measurement requirement is shorter than the second measurement interval corresponding to the second measurement requirement.

In some implementations, if a first measurement interval corresponding to the first measurement requirement is equal to a second measurement interval corresponding to the second measurement requirement, the processing unit determines the measurement requirement for performing measurement relaxation on a neighbor cell to be any one of the first measurement requirement and the second measurement requirement.

In some implementations, if the first information includes the first measurement requirement corresponding to the first measurement-relaxation criterion and the second measurement requirement corresponding to the second measurement-relaxation criterion, the processing unit is configured to determine a length of each of a first measurement interval corresponding to the first measurement requirement and a second measurement interval corresponding to the second measurement requirement, and determine, according to the length of each of the first measurement interval and the second measurement interval, the measurement requirement for performing measurement relaxation on a neighbor cell.

In some implementations, the processing unit 901 is configured to determine that the measurement requirement for performing measurement relaxation on a neighbor cell is the first measurement requirement, if the first measurement interval is longer than the second measurement interval; or determine that the measurement requirement for performing measurement relaxation on a neighbor cell is the second measurement requirement, if the second measurement interval is longer than the first measurement interval; or determine that the measurement requirement for performing measurement relaxation on a neighbor cell is any one of the first measurement requirement and the second measurement requirement, if the first measurement interval is equal to the second measurement interval.

In some implementations, the measurement requirement specified in a protocol includes the following. If the measurement result of a serving cell fulfills both the first measurement-relaxation criterion and the second measurement-relaxation criterion, the measurement requirement for performing measurement relaxation on a neighbor cell is the first measurement requirement. Or if the measurement result of a serving cell fulfills both the first measurement-relaxation criterion and the second measurement-relaxation criterion, the measurement requirement for performing measurement relaxation on a neighbor cell is the second measurement requirement.

In some implementations, the processing unit 901 is configured to determine that the measurement requirement for performing measurement relaxation on a neighbor cell is the first measurement requirement, if the measurement requirement specified in a protocol is the first measurement requirement. Or the processing unit 901 is configured to determine that the measurement requirement for performing measurement relaxation on a neighbor cell is the second measurement requirement, if the measurement requirement specified in a protocol is the second measurement requirement.

In some implementations, if the first information includes the first indication information, the terminal device 900 further includes a second receiving unit 903. The second receiving unit 903 is configured to receive the first indication information transmitted by the network device. The first indication information indicates that if the measurement result of a serving cell fulfills both the first measurement-relaxation criterion and the second measurement-relaxation criterion, the measurement requirement for performing measurement relaxation on a neighbor cell is the first measurement requirement. Or the first indication information indicates that if the measurement result of a serving cell fulfills both the first measurement-relaxation criterion and the second measurement-relaxation criterion, the measurement requirement for performing measurement relaxation on a neighbor cell is the second measurement requirement.

In some implementations, the processing unit is configured to determine that the measurement requirement for performing measurement relaxation on a neighbor cell is the first measurement requirement, on condition that the first indication information indicates that if the measurement result of a serving cell fulfills both the first measurement-relaxation criterion and the second measurement-relaxation criterion, the measurement requirement for performing measurement relaxation on a neighbor cell is the first measurement requirement. Or the processing unit 901 is configured to determine that the measurement requirement for performing measurement relaxation on a neighbor cell is the second measurement requirement, on condition that the first indication information indicates that if the measurement result of a serving cell fulfills both the first measurement-relaxation criterion and the second measurement-relaxation criterion, the measurement requirement for performing measurement relaxation on a neighbor cell is the second measurement requirement.

In some implementations, if the first information includes the period in which the measurement result of a serving cell fulfills the first measurement-relaxation criterion and the period in which the measurement result of a serving cell fulfills the second measurement-relaxation criterion, the processing unit 901 is configured to determine that the measurement requirement for performing measurement relaxation on a neighbor cell is a measurement requirement corresponding to a measurement-relaxation criterion that is fulfilled earlier by the measurement result of a serving cell.

In some implementations, the processing unit 901 is configured to determine that the measurement requirement for performing measurement relaxation on a neighbor cell is the first measurement requirement, if the measurement result of a serving cell fulfills the first measurement-relaxation criterion earlier, and the measurement result of a serving cell fulfills the second measurement-relaxation criterion in the period in which the measurement result of a serving cell fulfills the first measurement-relaxation criterion. Or the processing unit 901 is configured to determine that the measurement requirement for performing measurement relaxation on a neighbor cell is the second measurement requirement, if the measurement result of a serving cell fulfills the second measurement-relaxation criterion earlier, and the measurement result of a serving cell fulfills the first measurement-relaxation criterion in the period in which the measurement result of a serving cell fulfills the second measurement-relaxation criterion.

In some implementations, if the first information includes the period in which the measurement result of a serving cell fulfills the first measurement-relaxation criterion and the period in which the measurement result of a serving cell fulfills the second measurement-relaxation criterion, the processing unit is configured to determine that the measurement requirement for performing measurement relaxation on a neighbor cell is the first measurement requirement or the second measurement requirement, on condition that the first measurement-relaxation criterion is fulfilled by the measurement result of a serving cell as early as the second measurement-relaxation criterion.

In some implementations, if the first information includes the period in which the measurement result of a serving cell fulfills the first measurement-relaxation criterion and the period in which the measurement result of a serving cell fulfills the second measurement-relaxation criterion, the processing unit 901 is configured to determine, based on second indication information transmitted by the network device, the measurement requirement for performing measurement relaxation on a neighbor cell.

In some implementations, the processing unit 901 is configured to determine that the measurement requirement for performing measurement relaxation on a neighbor cell is the first measurement requirement, on condition that the second indication information indicates that if the first measurement-relaxation criterion is fulfilled by the measurement result of a serving cell as early as the second measurement-relaxation criterion, the measurement requirement for performing measurement relaxation on a neighbor cell is the first measurement requirement. The processing unit 901 is configured to determine that the measurement requirement for performing measurement relaxation on a neighbor cell is the second measurement requirement, on condition that the second indication information indicates that if the first measurement-relaxation criterion is fulfilled by the measurement result of a serving cell as early as the second measurement-relaxation criterion, the measurement requirement for performing measurement relaxation on a neighbor cell is the second measurement requirement.

The terminal device 900 further includes a third receiving unit 904. The third receiving unit 904 is configured to receive third indication information. The third indication information indicates that if the measurement result of a serving cell fulfills any one of the first measurement-relaxation criterion and the second measurement-relaxation criterion, whether the measurement result of a serving cell fulfills the other one of the first measurement-relaxation criterion and the second measurement-relaxation criterion is determined.

The first measurement-relaxation criterion is a low-mobility criterion, and the second measurement-relaxation criterion is a not-cell-edge criterion. Or the first measurement-relaxation criterion is the not-cell-edge criterion, and the second measurement-relaxation criterion is the low-mobility criterion.

Figure 9:
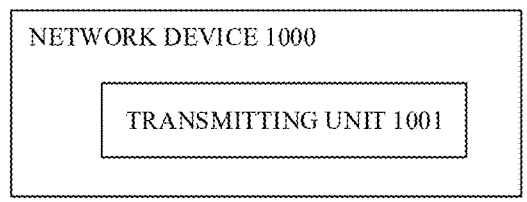
FIG. 9 is a schematic diagram illustrating a possible structure of a network device according to implementations of the disclosure.

In order to implement the foregoing method, implementations of the disclosure further provide a network device. FIG. 9 is a schematic diagram illustrating another possible structure of the network device. The network device 1000 includes a transmitting unit 1001. The transmitting unit 1001 is configured to transmit fourth indication information. The fourth indication information is used for a terminal device to determine a measurement requirement for performing measurement relaxation on a neighbor cell.

In some implementations, the fourth indication information indicates that if a measurement result of a serving cell fulfills both a first measurement-relaxation criterion and a second measurement-relaxation criterion, the measurement requirement for performing measurement relaxation on a neighbor cell is a measurement requirement corresponding to a longer measurement interval among the first measurement-relaxation criterion and the second measurement-relaxation criterion.

In some implementations, the fourth indication information indicates that if a measurement result of a serving cell fulfills both a first measurement-relaxation criterion and a second measurement-relaxation criterion, the measurement requirement for performing measurement relaxation on a neighbor cell is a first measurement requirement corresponding to the first measurement-relaxation criterion. Or the fourth indication information indicates that if the measurement result of a serving cell fulfills both the first measurement-relaxation criterion and the second measurement-relaxation criterion, the measurement requirement for performing measurement relaxation on a neighbor cell is a second measurement requirement corresponding to the second measurement-relaxation criterion.

In some implementations, the fourth indication information indicates that if a first measurement-relaxation criterion is fulfilled by a measurement result of a serving cell as early as a second measurement-relaxation criterion, the measurement requirement for performing measurement relaxation on a neighbor cell is a first measurement requirement corresponding to the first measurement-relaxation criterion. Or the fourth indication information indicates that if the first measurement-relaxation criterion is fulfilled by the measurement result of a serving cell as early as the second measurement-relaxation criterion, the measurement requirement for performing measurement relaxation on a neighbor cell is a second measurement requirement corresponding to the second measurement-relaxation criterion.

In some implementations, the transmitting unit 1001 is further configured to transmit fifth indication information. The fifth indication information indicates that if the measurement result of a serving cell fulfills any one of the first measurement-relaxation criterion and the second measurement-relaxation criterion, the terminal device determines whether the measurement result of a serving cell fulfills the other one of the first measurement-relaxation criterion and the second measurement-relaxation criterion.

In some implementations, the first measurement-relaxation criterion is a low-mobility criterion, and the second measurement-relaxation criterion is a not-cell-edge criterion. Or the first measurement-relaxation criterion is the not-cell-edge criterion, and the second measurement-relaxation criterion is the low-mobility criterion.

Implementations of the disclosure further provide a terminal device. The terminal device includes a processor and a memory configured to store computer programs executable by the processor. The processor, when executing the computer programs, is configured to perform the method implemented by the terminal device described above.

Implementations of the disclosure further provide a network device. The terminal device includes a processor and a memory configured to store computer programs executable by the processor. The processor, when executing the computer programs, is configured to perform the method implemented by the network device described above.

Implementations of the disclosure further provide a chip. The chip includes a processor. The processor is configured to invoke and execute computer programs stored in a memory, to cause a device equipped with the chip to perform the method implemented by the terminal device described above.

Implementations of the disclosure further provide a chip. The chip includes a processor. The processor is configured to invoke and execute computer programs stored in a memory, to cause a device equipped with the chip to perform the method implemented by the network device described above.

Implementations of the disclosure further provide a storage medium. The storage medium is configured to store executable programs which, when executed by a processor, are operable to perform the method implemented by the terminal device described above.

Implementations of the disclosure further provide a storage medium. The storage medium is configured to store executable programs which, when executed by a processor, are operable to perform the method implemented by the network device described above.

Implementations of the disclosure further provide a computer program product. The computer program product includes computer program instructions which are operable with a computer to perform the method implemented by the terminal device described above.

Implementations of the disclosure further provide a computer program product. The computer program product includes computer program instructions which are operable with a computer to perform the method implemented by the network device described above.

Implementations of the disclosure further provide a computer program. The computer program is operable with a computer to perform the method implemented by the terminal device described above.

Implementations of the disclosure further provide a computer program. The computer program is operable with a computer to perform the method implemented by the network device described above.

Figure 10:
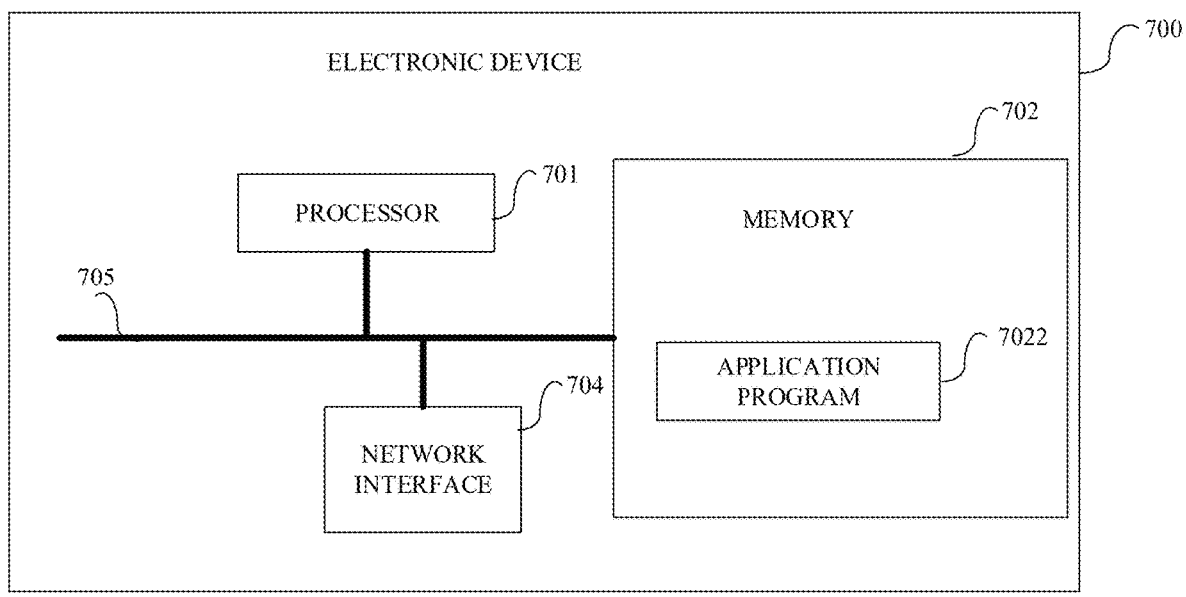
FIG. 10 is a schematic diagram illustrating a hardware structure of an electronic device according to implementations of the disclosure.

FIG. 10 is a schematic diagram illustrating a hardware structure of an electronic device (terminal device or network device) according to implementations of the disclosure. The electronic device 700 includes at least one processor 701, a memory 702, and at least one network interface 704. Various components in the electronic device 700 are coupled together via a bus system 705. It can be understood that, the bus system 705 is configured for connection and communication between these components. In addition to a data bus, the bus system 705 further includes a power bus, a control bus, and a status signal bus. However, for the convenience of illustration, various buses are marked as the bus system 705 in FIG. 10.

It can be understood that, the memory 702 may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM), a ferromagnetic random access memory (FRAM), a flash memory, a magnetic surface memory, an optical disc, or a compact disc ROM (CD-ROM). The magnetic surface memory may be a magnetic disc memory or a magnetic tape memory. The volatile memory can be a RAM that acts as an external cache. By way of example but not limitation, many forms of RAM are available, such as a static RAM (SRAM), a synchronous static random access memory (SSRAM), a dynamic RAM (DRAM), a synchronous DRAM (SDRAM), a double data rate SDRAM (DDR SDRAM), an enhanced SDRAM (ESDRAM), a synchronous link DRAM (synchlink DRAM, SLDRAM), and a direct rambus RAM (DR-RAM). The memory 702 described in implementations of the disclosure is intended to include, but is not limited to, these and any other suitable types of memory.

The memory 702 in implementations of the disclosure is configured to store various types of data to support operations of the electronic device 700. Examples of the data includes any computer program operable with the electronic device 700, such as an application program 7022. Programs for implementing the method of implementations of the disclosure may be contained in the application program 7022.

The foregoing method disclosed in implementations of the disclosure can be applied to the processor 701, or can be implemented by the processor 701. The processor 701 may be an integrated circuit chip with signal processing capabilities. During implementation, each step of the foregoing method may be completed by an integrated logic circuit in the form of hardware or an instruction in the form of software in the processor 701. The processor 701 may be a general-purpose processor, a digital signal processor (DSP), or other programmable logic devices, discrete gates or transistor logic devices, discrete hardware components, etc. The processor 701 can implement or execute the methods, steps, and logic blocks disclosed in implementations of the disclosure. The general purpose processor may be a microprocessor, or may be any conventional processor or the like. The steps of the method disclosed in implementations of the disclosure may be implemented through a hardware decoding processor, or may be performed by hardware and software modules in the decoding processor. The software module can be located in a storage medium. The storage medium is located in the memory 702. The processor 701 reads the information in the memory 702, and completes the steps of the method described above with the hardware of the processor 701.

In exemplary implementations, the electronic device 700 may be implemented by one or more application specific integrated circuits (ASIC), DSPs, programmable logic devices (PLD), complex programmable logic devices (CPLD), field programmable gate arrays (FPGA), general-purpose processors, controllers, microcontroller units (MCU), microprocessor units (VIPU), or other electronic components, to implement the foregoing method.

The disclosure is described herein with reference to schematic flowcharts and/or block diagrams of methods, apparatuses (systems), and computer program products according to implementations of the disclosure. It should be understood that each flow and/or block in the flowchart and/or block diagram, and a combination of flow and/or block in the flowchart and/or block diagram can be implemented by computer program instructions. These computer program instructions may be provided to a general purpose computer, a special purpose computer, an embedded processor, or a processor of other programmable data processing apparatuses to form a machine, such that devices for implementing functions specified by one or more flows in the flowchart and/or one or more blocks in the block diagram may be generated by executing the instructions with the computer or the processor of other programmable data processing apparatuses.

The computer program instructions may also be stored in a computer-readable memory that can direct the computer or other programmable data processing apparatuses to operate in a given manner, so that the instructions stored in the computer-readable memory produce a manufactured article including an instruction device, and the instruction device implements the functions specified by one or more flows in the flowchart and/or one or more blocks in the block diagram.

The computer program instructions may also be loaded onto the computer or other programmable data processing apparatuses, such that a series of process steps may be executed on the computer or other programmable apparatuses to produce processing implemented by the computer, so that the instructions executed on the computer or other programmable apparatuses provide steps for implementing the functions specified by one or more flows in the flowchart and/or one or more blocks in the block diagram.

In the method for measurement-relaxation requirement determination, the electronic device, and the storage medium provided in implementations of the disclosure, if the measurement result of a serving cell fulfills both the first measurement-relaxation criterion and the second measurement-relaxation criterion, the terminal device determines, based on the first information, the measurement requirement for performing measurement relaxation on a neighbor cell. The first information includes at least one of: the first indication information transmitted by the network device, the measurement requirement specified in a protocol, the first measurement requirement corresponding to the first measurement-relaxation criterion and the second measurement requirement corresponding to the second measurement-relaxation criterion, or the period in which the measurement result of a serving cell fulfills the first measurement-relaxation criterion and the period in which the measurement result of a serving cell fulfills the second measurement-relaxation criterion. As such, for a scenario in which two relaxation criteria correspond to different measurement requirements, behavior of the terminal device regarding measurement relaxation on a neighbor cell in case the measurement result of a serving cell fulfills both the first measurement-relaxation criterion and the second measurement-relaxation criterion is determined, which can avoid inconsistency between the network device and the terminal device in understanding of measurement relaxation on a neighbor cell.

It should be understood that, the terms "system" and "network" in the disclosure are usually used interchangeably throughout this disclosure. The term "and/or" in the disclosure only describes an association relationship between associated objects, which means that there can be three relationships. For example, A and/or B can mean A alone, both A and B exist, and B alone. In addition, the character "/" in the disclosure generally indicates that the associated objects are in an "or" relationship.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for measurement-relaxation requirement determination, comprising:
   determining based on first information received from a network device, by a terminal device, a measurement requirement for performing measurement relaxation on a neighbor cell, when a measurement result of a serving cell fulfills both a first measurement-relaxation criterion and a second measurement-relaxation criterion; and
   performing measurement relaxation, by the terminal device, on the neighbor cell according to the measurement requirement determined;
   the first information comprising a first measurement requirement corresponding to the first measurement-relaxation criterion and a second measurement requirement corresponding to the second measurement-relaxation criterion;
   determining based on the first information, by the terminal device, the measurement requirement for performing measurement relaxation on a neighbor cell comprising:
   determining, by the terminal device, a length of each of a first measurement interval corresponding to the first measurement requirement and a second measurement interval corresponding to the second measurement requirement; and
   determining, according to the length of each of the first measurement interval and the second measurement interval, by the terminal device, the measurement requirement for performing measurement relaxation on a neighbor cell.

2. The method of claim 1, wherein the first information further comprises first indication information, the method further comprises:
receiving, by the terminal device, the first indication information transmitted by the network device, wherein the first indication information indicates that when the measurement result of a serving cell fulfills both the first measurement-relaxation criterion and the second measurement-relaxation criterion, the measurement requirement for performing measurement relaxation on a neighbor cell is a measurement requirement corresponding to a longer measurement interval among the first measurement-relaxation criterion and the second measurement-relaxation criterion.

3. The method of claim 2, wherein determining based on the first information, by the terminal device, the measurement requirement for performing measurement relaxation on a neighbor cell comprises:
determining, by the terminal device, to perform measurement relaxation on a neighbor cell based on the first measurement requirement, when a first measurement interval corresponding to the first measurement requirement is longer than a second measurement interval corresponding to the second measurement requirement; or
determining, by the terminal device, that the measurement requirement for performing measurement relaxation on a neighbor cell is the second measurement requirement, when the first measurement interval corresponding to the first measurement requirement is shorter than the second measurement interval corresponding to the second measurement requirement.

4. The method of claim 1, wherein determining, according to the length of each of the first measurement interval and the second measurement interval, by the terminal device, the measurement requirement for performing measurement relaxation on a neighbor cell comprises:
determining, by the terminal device, that the measurement requirement for performing measurement relaxation on a neighbor cell is the first measurement requirement, when the first measurement interval is longer than the second measurement interval; or
determining, by the terminal device, that the measurement requirement for performing measurement relaxation on a neighbor cell is the second measurement requirement, when the second measurement interval is longer than the first measurement interval; or
determining, by the terminal device, that the measurement requirement for performing measurement relaxation on a neighbor cell is any one of the first measurement requirement and the second measurement requirement, when the first measurement interval is equal to the second measurement interval.

5. The method of claim 1, wherein the first information further comprises a measurement requirement specified in a protocol, which comprises:
when the measurement result of a serving cell fulfills both the first measurement-relaxation criterion and the second measurement-relaxation criterion, the measurement requirement for performing measurement relaxation on a neighbor cell is the first measurement requirement; or
when the measurement result of a serving cell fulfills both the first measurement-relaxation criterion and the second measurement-relaxation criterion, the measurement requirement for performing measurement relaxation on a neighbor cell is the second measurement requirement.

6. The method of claim 5, wherein determining based on the first information, by the terminal device, the measurement requirement for performing measurement relaxation on a neighbor cell comprises:
determining, by the terminal device, that the measurement requirement for performing measurement relaxation on a neighbor cell is the first measurement requirement, when the measurement requirement specified in a protocol is the first measurement requirement; or
determining, by the terminal device, that the measurement requirement for performing measurement relaxation on a neighbor cell is the second measurement requirement, when the measurement requirement specified in a protocol is the second measurement requirement.

7. The method of claim 1, wherein the first information further comprises first indication information, the method further comprises:
receiving, by the terminal device, the first indication information transmitted by the network device, wherein
the first indication information indicates that when the measurement result of a serving cell fulfills both the first measurement-relaxation criterion and the second measurement-relaxation criterion, the measurement requirement for performing measurement relaxation on a neighbor cell is the first measurement requirement; or
the first indication information indicates that when the measurement result of a serving cell fulfills both the first measurement-relaxation criterion and the second measurement-relaxation criterion, the measurement requirement for performing measurement relaxation on a neighbor cell is the second measurement requirement.

8. The method of claim 7, wherein determining based on the first information, by the terminal device, the measurement requirement for performing measurement relaxation on a neighbor cell comprises:
determining, by the terminal device, that the measurement requirement for performing measurement relaxation on a neighbor cell is the first measurement requirement, on condition that the first indication information indicates that when the measurement result of a serving cell fulfills both the first measurement-relaxation criterion and the second measurement-relaxation criterion, the measurement requirement for performing measurement relaxation on a neighbor cell is the first measurement requirement; or
determining, by the terminal device, that the measurement requirement for performing measurement relaxation on a neighbor cell is the second measurement requirement, on condition that the first indication information indicates that when the measurement result of a serving cell fulfills both the first measurement-relaxation criterion and the second measurement-relaxation criterion, the measurement requirement for performing measurement relaxation on a neighbor cell is the second measurement requirement.

9. The method of claim 1, wherein
the first measurement-relaxation criterion is a low-mobility criterion, and the second measurement-relaxation criterion is a not-cell-edge criterion; or
the first measurement-relaxation criterion is the not-cell-edge criterion, and the second measurement-relaxation criterion is the low-mobility criterion.

10. A method for measurement-relaxation requirement determination, comprising:
- configuring, by a network device, a first measurement-relaxation criterion and a second measurement-relaxation criterion for a terminal device, wherein the first measurement-relaxation criterion and the second measurement-relaxation criterion have different measurement intervals;
- transmitting, by the network device, indication information to the terminal device, wherein the indication information indicates that when a measurement result of a serving cell fulfills both the first measurement-relaxation criterion and the second measurement-relaxation criterion, the measurement requirement for performing measurement relaxation on a neighbor cell is a measurement requirement corresponding to a longer measurement interval among the first measurement-relaxation criterion and the second measurement-relaxation criterion.

11. The method of claim 10, wherein:
- the indication information indicates that when a measurement result of a serving cell fulfills both a first measurement-relaxation criterion and a second measurement-relaxation criterion, the measurement requirement for performing measurement relaxation on a neighbor cell is a first measurement requirement corresponding to the first measurement-relaxation criterion; or
- the indication information indicates that when the measurement result of a serving cell fulfills both the first measurement-relaxation criterion and the second measurement-relaxation criterion, the measurement requirement for performing measurement relaxation on a neighbor cell is a second measurement requirement corresponding to the second measurement-relaxation criterion.

12. The method of claim 10, further comprising:
- transmitting, by the network device, another indication information, wherein the another indication information indicates that when the measurement result of the serving cell fulfills any one of the first measurement-relaxation criterion and the second measurement-relaxation criterion, the terminal device determines whether the measurement result of a serving cell fulfills the other one of the first measurement-relaxation criterion and the second measurement-relaxation criterion.

13. The method of claim 10, wherein:
- the first measurement-relaxation criterion is a low-mobility criterion, and the second measurement-relaxation criterion is a not-cell-edge criterion; or
- the first measurement-relaxation criterion is the not-cell-edge criterion, and the second measurement-relaxation criterion is the low-mobility criterion.

14. A terminal device, comprising:
- a processor; and
- a memory storing computer programs which, when executed by the processor, are operable with the processor to:
- determine, based on first information, a measurement requirement for performing measurement relaxation on a neighbor cell, when a measurement result of a serving cell fulfills both a first measurement-relaxation criterion and a second measurement-relaxation criterion; and
- perform measurement relaxation on the neighbor cell according to the measurement requirement determined;
- the first information comprising a first measurement requirement corresponding to the first measurement-relaxation criterion and a second measurement requirement corresponding to the second measurement-relaxation criterion;
- the processor configured to determine, based on the first information, the measurement requirement for performing measurement relaxation on a neighbor cell is configured to:
- determine a length of each of a first measurement interval corresponding to the first measurement requirement and a second measurement interval corresponding to the second measurement requirement; and
- determine, according to the length of each of the first measurement interval and the second measurement interval, by the terminal device, the measurement requirement for performing measurement relaxation on a neighbor cell.

15. The terminal device of claim 14, wherein the processor is configured to:
- determine that the measurement requirement for performing measurement relaxation on a neighbor cell is the first measurement requirement, when the first measurement interval is longer than the second measurement interval; or
- determine that the measurement requirement for performing measurement relaxation on a neighbor cell is the second measurement requirement, when the second measurement interval is longer than the first measurement interval; or
- determine that the measurement requirement for performing measurement relaxation on a neighbor cell is any one of the first measurement requirement and the second measurement requirement, when the first measurement interval is equal to the second measurement interval.

16. The terminal device of claim 14, wherein the first information further comprises measurement requirement specified in a protocol, which comprises one of:
- when the measurement result of a serving cell fulfills both the first measurement-relaxation criterion and the second measurement-relaxation criterion, the measurement requirement for performing measurement relaxation on a neighbor cell is the first measurement requirement; or
- when the measurement result of a serving cell fulfills both the first measurement-relaxation criterion and the second measurement-relaxation criterion, the measurement requirement for performing measurement relaxation on a neighbor cell is the second measurement requirement.

* * * * *